(12) United States Patent
Yamamoto

(10) Patent No.: US 11,100,666 B2
(45) Date of Patent: Aug. 24, 2021

(54) IMAGE PROCESSING METHOD AND IMAGE CAPTURING APPARATUS

(71) Applicant: CANON KABUSHIKI KAISHA, Tokyo (JP)

(72) Inventor: Kenkichi Yamamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/296,051

(22) Filed: Mar. 7, 2019

(65) Prior Publication Data

US 2019/0206076 A1 Jul. 4, 2019

Related U.S. Application Data

(63) Continuation of application No. 14/696,213, filed on Apr. 24, 2015, now Pat. No. 10,311,592.

(30) Foreign Application Priority Data

Apr. 28, 2014 (JP) ................................ 2014-093086

(51) Int. Cl.
*G06T 7/66* (2017.01)
*G06T 7/73* (2017.01)

(52) U.S. Cl.
CPC .................. *G06T 7/66* (2017.01); *G06T 7/74* (2017.01); *G06T 2200/28* (2013.01); *G06T 2207/10016* (2013.01); *G06T 2207/30164* (2013.01)

(58) Field of Classification Search
None
See application file for complete search history.

(56) References Cited

U.S. PATENT DOCUMENTS

| 10,311,592 B2* | 6/2019 | Yamamoto | G06T 7/66 |
| 2003/0048464 A1* | 3/2003 | Yamada | H04N 1/6005 358/1.9 |
| 2005/0122409 A1* | 6/2005 | Takeshita | H04N 1/6027 348/223.1 |
| 2005/0195290 A1* | 9/2005 | Takeshita | H04N 9/735 348/223.1 |

(Continued)

FOREIGN PATENT DOCUMENTS

| JP | 2013-206175 A | 10/2013 | |
| JP | 2013206175 A | * 10/2013 | ............... G06T 7/00 |

*Primary Examiner* — Reza Aghevli
(74) *Attorney, Agent, or Firm* — Canon U.S.A., Inc. IP Division

(57) ABSTRACT

An image processing method includes acquiring a plurality of image data items by continuously capturing images of an object by an image capturing apparatus (S1), transmitting the plurality of image data items to a computing section (S2), computing image feature values each of which relates to positional information and information correlated with illumination conditions of each of the image data items by using the computing section (S3), comparing degrees of matching between reference image feature values, each of which corresponds to positional information and information correlated with illumination conditions, and the plurality of image data items (S4), and selecting, from the plurality of image data items, an image having positional information and illumination conditions that match the reference image feature values and outputting the image (S5).

28 Claims, 8 Drawing Sheets

(56) References Cited

U.S. PATENT DOCUMENTS

| | | | |
|---|---|---|---|
| 2006/0165293 A1* | 7/2006 | Hamanaka | G06K 9/00228 382/209 |
| 2008/0030798 A1* | 2/2008 | O'Neil | G07D 7/206 358/448 |
| 2010/0177164 A1* | 7/2010 | Zalevsky | H01L 23/535 348/46 |
| 2011/0052045 A1* | 3/2011 | Kameyama | H04N 19/30 382/154 |
| 2011/0149069 A1* | 6/2011 | Ishii | G06T 7/248 348/135 |
| 2011/0299770 A1* | 12/2011 | Vaddadi | G06K 9/6211 382/165 |
| 2012/0014570 A1* | 1/2012 | Abe | G06K 9/00067 382/124 |
| 2012/0026354 A1* | 2/2012 | Hamada | G06K 9/6202 348/222.1 |
| 2012/0145779 A1* | 6/2012 | Bietenbeck | G06K 19/06037 235/375 |
| 2013/0076892 A1* | 3/2013 | Nahum | G01B 11/002 348/135 |
| 2013/0215270 A1* | 8/2013 | Murashita | G06T 7/74 348/148 |
| 2013/0242127 A1* | 9/2013 | Kasahara | H04N 5/23219 348/222.1 |
| 2014/0292657 A1* | 10/2014 | Chen | G06F 3/0383 345/166 |
| 2014/0355826 A1* | 12/2014 | Mitsui | G06K 9/00147 382/103 |
| 2015/0125066 A1* | 5/2015 | Isomura | G06T 7/001 382/149 |
| 2015/0279024 A1* | 10/2015 | Tsuchiya | G06T 7/0006 382/144 |
| 2015/0348313 A1* | 12/2015 | Fuchikami | G06T 5/006 348/333.01 |
| 2016/0034787 A1* | 2/2016 | Mitsui | H04N 5/374 382/159 |
| 2016/0140420 A1* | 5/2016 | Di Venuto Dayer, V | G06K 9/78 382/103 |

* cited by examiner

IMAGE PROCESSING METHOD AND IMAGE CAPTURING APPARATUS

CROSS-REFERENCE TO RELATED APPLICATIONS

This application is a Continuation of U.S. patent application Ser. No. 14/696,213, filed Apr. 24, 2015, which claims the benefit of Japanese Patent Application No. 2014-093086, filed Apr. 28, 2014, both of which are hereby incorporated by reference herein in their entirety.

BACKGROUND OF THE INVENTION

Field of the Invention

The present invention relates to a method and an apparatus for capturing an image of an object by using a camera. More particularly, the present invention relates to a technology for capturing an image of an object that moves with respect to a camera.

Description of the Related Art

In an automatic assembly line for a product using a robot, an operation in which the robot holds a component, which has been supplied, and mounts the component, which has been held by the robot, on a workpiece is repeated. In the case where the supplied component is not strictly positioned, measurement of the position and orientation of the component by using a camera may sometimes be performed in a process for holding the component.

This measurement is performed in order to bring the position and orientation of the component, which has been held by the robot, relative to the robot as close to a target position and a target orientation as possible. In other words, "a predetermined way in which the robot holds a component", which is a target value, and "the actual way in which the robot holds a component", which is an actually measured value, are compared with each other, and in the case where there is a difference between the target value and the actually measured value, the robot performs a process for causing the actually measured value to be the same as the target value. This process is performed in order to achieve an improvement in the accuracy with which assembly is performed by the robot in a process that is to be performed after the robot has held a component.

An exemplary specific method is as follows: the robot holds a component, then transports the component to a position in front of a camera, and after that, stops its operation. A still image of the component is captured by the camera, and the captured still image undergoes image processing, so that the position and orientation of the component relative to the robot are recognized. The robot performs a process for changing its orientation and a process for changing the way in which the component is held on the basis of the recognition results, so that the position and orientation of the component are changed to be within a range in which a process for mounting the component on a workpiece can be performed. After that, an assembly operation is performed.

In recent years, there has been a need to automatically assemble a product by using a robot with good efficiency while using visual information obtained by a camera. Thus, in order to achieve a further improvement in productivity per hour, it is effective to reduce as much as possible an increase in the time taken for transportation of a component due to slowing down, interruption, actuation, and speeding up of a robot, which occur during image capturing. Ultimately, it is desirable that an image of the component be captured while the component is moving in front of the camera without stopping the robot from transporting the component (this method will be hereinafter referred to as a method for capturing an image of a moving object).

In the method for capturing an image of a moving object, a sample image of an object (a target value) that has been previously stored and an image of the object captured while the object is moving (an actually measured value) are compared with each other, and the object to be measured is recognized in accordance with the level of similarity between the values.

In order to perform an image capturing of a moving object with high recognition accuracy, an image processing algorithm is determined, and in actual measurement, an image of an object needs to be captured while the object is moving at a resolution similar to that in a sample image of the object that has been stored as a target value in such a manner as to correspond to the image processing algorithm.

In addition, an image of the object needs to be captured under illumination conditions, such as reflections of shadows and ambient light, that are as similar to the illumination conditions under which the sample image has been acquired as possible.

For example, assume the case where an image processing algorithm that measures the position and orientation of a component, which is an object, by utilizing a mark placed on the component is used. In this case, in actual image capturing, the light of fluorescent lamps installed inside a factory may sometimes be reflected off a surface of the component, and glare may sometimes be produced. In addition, an image capturing may sometimes be performed under illumination conditions under which the mark is invisible to a camera due to the influence of such glare, and there is a possibility that the position and orientation of the component will be falsely recognized.

In the field of such image capturing of a moving object, as described in Japanese Patent Laid-Open No. 9-288060 (hereinafter referred to as Patent Document 1), a technology for extracting an image suitable for image analysis by capturing images of a moving component has been designed.

The following technology is described in Patent Document 1. In the technology described in Patent Document 1, a plurality of images of an object that is conveyed in front of a camera by a conveyor are continuously (or intermittently) captured in accordance with image-capturing-trigger signals sent from a control unit of the camera at regular intervals. After that, an image in which the distance between the object and the center of the image is the smallest is selected as the best image among the plurality of captured images, and then, the best image is output.

Operation of a camera described in Patent Document 1 is as follows: first, the last captured image and an image captured before the last captured image are stored in a memory of the camera. In this state, one of the following is selected on the basis of the displacement amount of the position of an object with respect to the center of the image, which is calculated in each of the two images: (1) the last captured image is determined as the best image, (2) the image captured before the last captured image is determined as the best image, and (3) the determination process is suspended, and the image capturing operation continues. In the case where the displacement amount falls below a predetermined threshold, that is, in the case where the object is sufficiently near the center of the image, (1) is selected. In the case where the displacement amount in the last captured image is larger than the displacement amount in the image captured before the last captured image, that is, in the case where the object, which has come near the center of the image once, has passed through the center of the image and is moving in a direction away from the center of the image, (2) is selected. In the case where neither of the above cases holds true, (3) is selected. As a result, in the case where capturing an image of a moving object is performed by using the technology of the related art described in Patent Document 1, an image in which the distance between the position of a component and a position predetermined by a user (hereinafter sometimes referred to as target capturing position) is the smallest can be retrieved from images captured by a camera.

However, in the method for capturing an image of a moving object described in Patent Document 1, an image to be output is selected among captured images while only the position of a component functions as a reference. Thus, in the case where an image of a component whose orientation has been inclined due to vibration and the like generated during transportation of the component is captured, the image of the component is captured under conditions under which the position and orientation relationship between the component and the camera/illumination is different from the position and orientation relationship when the image processing algorithm is determined. Therefore, an image captured under illumination conditions that are different from those originally assumed is acquired, and there is a possibility that the brightness in a portion of the acquired image may be different from the brightness that has been assumed, and that contour information of an area different from the area that has been assumed may be strongly detected. In such a case, in the case where a process for image processing and a process for recognition of an object are performed, there is a possibility that the position and orientation of the component will be falsely recognized, which in turn leads to failure of automatic assembly.

SUMMARY OF THE INVENTION

The present invention has been made in view of the above problems. According to an aspect of the present invention, a method is provided for capturing an image of a moving component under illumination conditions similar to those under which an image with which an image processing algorithm is determined beforehand is acquired.

According to another aspect of the present invention, an image processing method includes acquiring a plurality of image data items by continuously capturing images of an object by an image capturing apparatus, transmitting the plurality of image data items to a computing section, computing image feature values each of which relates to positional information and information correlated with illumination conditions of a respective one of the image data items by using the computing section, and outputting an image selected from the plurality of image data items. In the outputting an image, degrees of matching between the positional information and a reference image feature value that is stored in a memory are compared, degrees of matching between the image feature values, which have been computed, and a reference image feature value that is stored in the memory and that relates to information correlated with illumination conditions are compared, and an image having positional information and illumination conditions that match the reference image feature values is selected from the plurality of image data items and output.

Further features of the present invention will become apparent from the following description of exemplary embodiments with reference to the attached drawings.

DESCRIPTION OF THE EMBODIMENTS

First Embodiment

An apparatus for capturing an image of a moving object according to a first embodiment of the present invention will be described. In the following description, a process of an image processing method according to the present invention will be described step by step, and after that, individual components included in a camera and the like will be specifically described with reference to an exemplary embodiment corresponding to the first embodiment.

Figure 1:
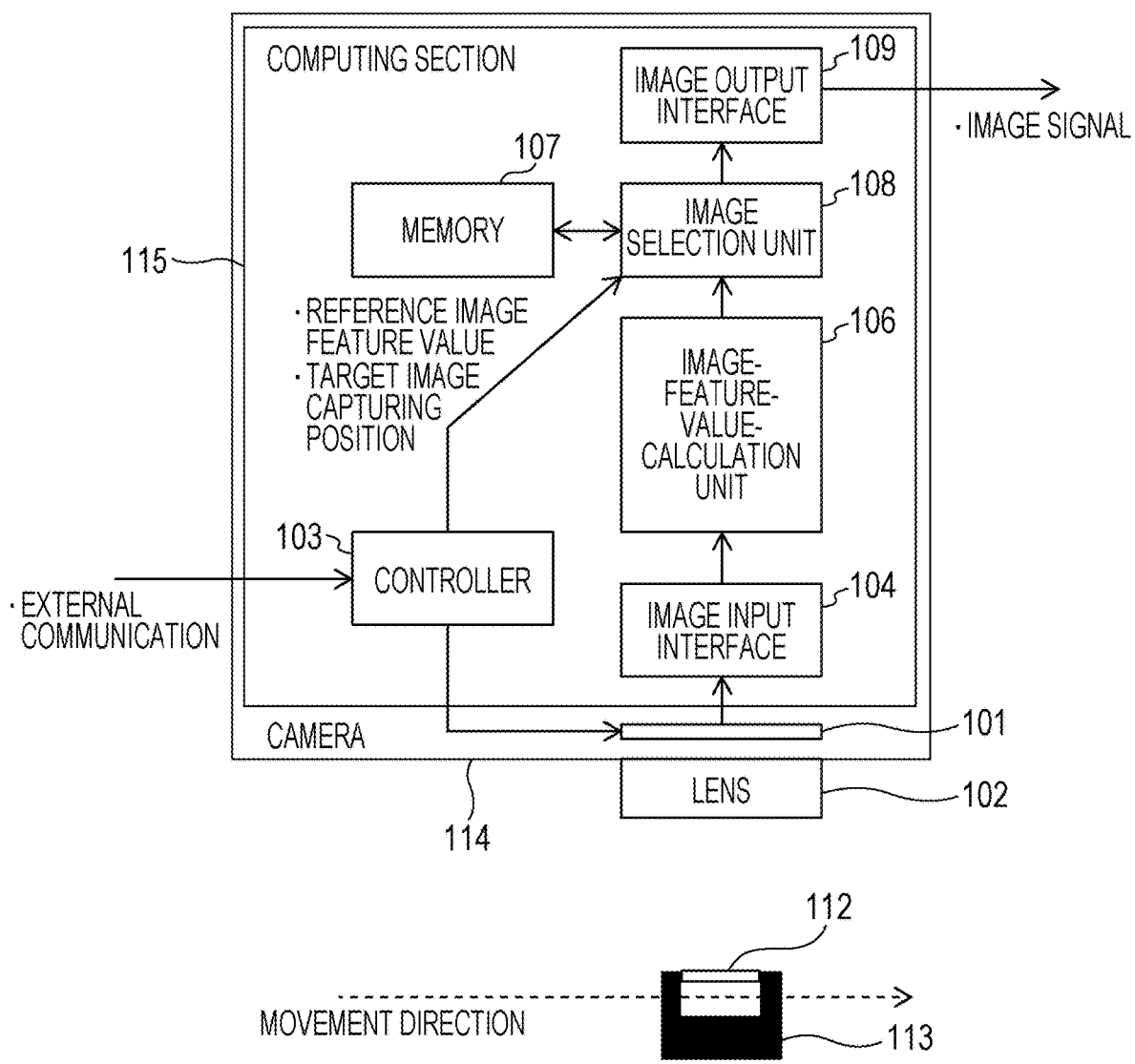
FIG. 1 is a block diagram illustrating an apparatus for capturing an image of a moving object according to a first embodiment of the present invention.

FIG. 1 illustrates the configuration of the apparatus for capturing an image (of a moving object), which will be sometimes referred to as image capturing apparatus, according to the first embodiment of the present invention. As illustrated in FIG. 1, the apparatus for capturing an image (of a moving object) includes a camera 114, which includes an image pickup element 101, a lens 102, and a computing section 115, and a robot hand 113 that is used for holding a component 112. The computing section 115 includes a controller 103, an image input interface 104, an image-feature-value-calculation unit 106, a memory 107, an image selection unit 108, and an image output interface 109.

First, the flow of processes when the image capturing apparatus captures an image of the component 112, which is moving while being held by the robot hand 113, by using the camera 114 will be briefly described, and then, signals in each component and the operation of each component will be described in detail.

Initial setting to be performed before performing capturing of an image of a moving object will be described first. The controller 103 sets a movie recording mode in which the image pickup element 101 continuously (or intermittently)

captures images as an operation mode of the image pickup element 101 through communication using a serial peripheral interface (SPI) or the like. The following two predetermined image feature values based on experiments, designed values, or the like are stored in a storage area of the controller 103. In other words, an image feature value, which is a target capturing position, and an image feature value that is correlated with illumination conditions at the target capturing position are stored as reference image feature values, and these reference image feature values are output beforehand to the image selection unit 108. Regarding an area in which data items such as the target capturing position and the image feature values are to be stored, a particular portion of the computing section 115 that has a storage function may be arbitrarily set as a "memory".

Note that details of a method for calculating the image feature value correlated with the illumination conditions will be described later. The robot hand 113 is instructed beforehand to move in such a manner that the component 112 crosses the visual field range of the camera 114 while the component 112 is being held by the robot hand 113. In the memory 107 in which an image data item and an image feature value are to be temporarily stored, an image having only pixels whose luminance values are "0" and an image feature value of "0" are stored as initial data items. The initial setting in the present embodiment is completed by performing these operations. Note that the target capturing position and the reference image feature values need not be stored in the storage area of the controller 103 and may be stored in the memory 107 and output to the image selection unit 108.

Figure 2:
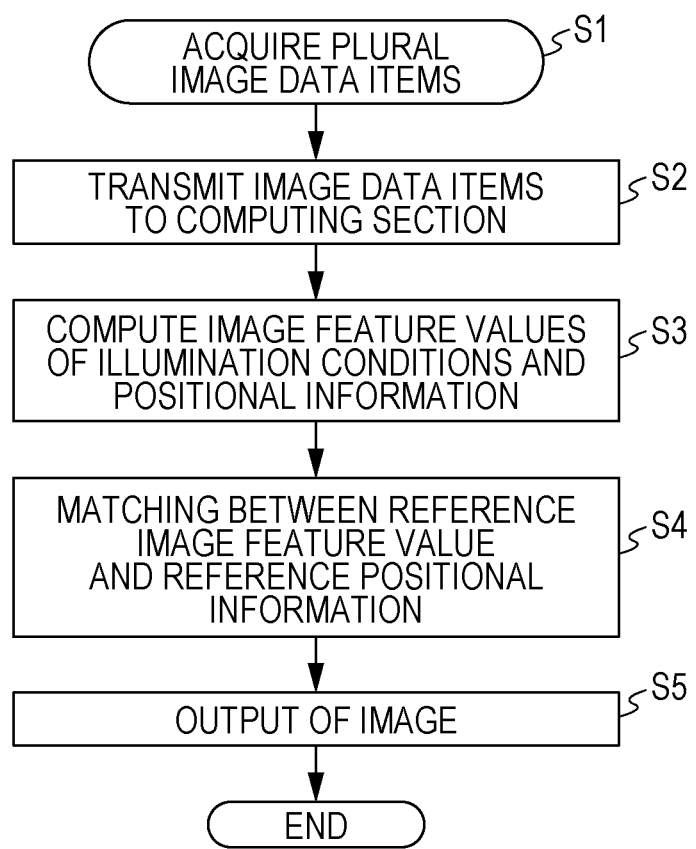
FIG. 2 is a flowchart according to the first embodiment of the present invention.

The flow of processes of acquiring image data items and image processing when capturing of an image of a moving object is performed will now be described with reference to the flowchart illustrated in FIG. 2.

(S1 Acquisition of Plural Image Data Items)

The operation mode of the image pickup element 101 has been set to the movie recording mode by the initial setting, and the image pickup element 101 acquires a plurality of image data items by continuously (intermittently) capturing images of the component 112 through the lens 106 until the component 112 reaches the vicinity of the target capturing position.

The image pickup element 101 is not limited to having the movie recording mode as its operation mode and may acquire a plurality of image data items by continually capturing sequential images of the component 112 at certain intervals. In the following description, the term "continuously capture images" also refers to image capturing performed in this manner.

(S2 Transmission of Image Data Item to Computing Section)

The captured images are sequentially output to the image input interface 104 as, for example, LVDS signals. In this case, the LVDS signals are transmitted through, for example, 10 pairs of differential signal lines, and the differential signal lines output serial signals, which are the LVDS signals multiplied by seven and serialized. The image input interface 104 sequentially converts image data items that are continuously input to the image input interface 104 as the LVDS signals into image data items in the form of parallel signals and outputs the image data items to the image-feature-value-calculation unit 106 of the computing section 115.

(S3 Compute Image Feature values of Illumination Conditions and Positional Information)

The image-feature-value-calculation unit 106 calculates image feature values of the image data items, which are input to the image-feature-value-calculation unit 106. In the present embodiment, two types of image feature values are used. One of the image feature values is an image feature value that relates to information that is correlated with positional information, which indicates the position of the component 112 in a captured image. The other one of the image feature values is an image feature value that is correlated with illumination conditions, which indicate an illumination environment in which image capturing is performed.

Here, illumination conditions denote, for example, the position and orientation of the component 112 with respect to the camera 114 and ambient light sources (not illustrated) such as lighting for use in image capturing (not illustrated) and a fluorescent lamp. As a specific example, there is a case where an inclination of the component 112 with respect to the camera 114 is larger than the inclination of the component 112 with respect to the camera 114 that has been assumed by using the image processing algorithm, so that illumination conditions are different from predetermined illumination conditions. In such a case, image brightness may sometimes be affected as a result of changes in the intensity of ambient light of the fluorescent lamp and the like reflected in an image, a position at which such ambient light is reflected, and the intensity of scattered light that is captured. Image brightness may also sometimes be affected as a result of changes in sharpnesses of a feature point and a contour line of a marker for use in image processing or the like, shading, and a position at which a shadow is generated.

The image feature value correlated with illumination conditions may be determined in the following manner.

First, images of the component 112 are acquired by capturing while the component 112 is inclined or the like in such a manner that the orientation of the component 112 with respect to the camera 114 differs between the images. In addition, it is confirmed whether there is an image feature value that significantly changes in accordance with the orientation of the component 112 among various image feature values included in data items of the images. The image feature value correlated with illumination conditions can be determined beforehand through these processes by a user who performs setting.

Examples of the image feature value correlated with illumination conditions include a total value of the luminance of an image, a total value of the luminance in image areas obtained by dividing an image into a plurality of blocks, the coordinate value of a feature point, the density gradient value in a particular image area, and the intensity value of a contour line. It is most desirable to use an image feature value that is used when the position and orientation of the component 112 are recognized by using images that have been captured by the image capturing apparatus. Alternatively, a plurality of image feature values may be used by, for example, normalizing the plurality of image feature values and calculating the average of the plurality of image feature values. In the following description of the present embodiment, as an example, a total value of the luminance of an image is used as the image feature value correlated with illumination conditions.

The image-feature-value-calculation unit 106 of the computing section 115 calculates these image feature values and outputs these image feature values with a corresponding image data item to the image selection unit 108. Details of a method for calculating the position of the component 112 and a method for calculating a total value of the luminance of an image will be described later. In the case where the position of the component 112 is not detected in an image, that is, in the case where the component 112 is not present in the field of view of the camera 114, the image-feature-value-calculation unit 106 outputs "0" as positional information to the image selection unit 108.

(S4 Matching between Reference Image Feature Value and Reference Positional Information)

While the image data item and the corresponding two image feature values are input to the image selection unit 108 from the image-feature-value-calculation unit 106, image feature values that are respectively correlated with positional information and illumination conditions are input to the image selection unit 108 from the controller 103. The image selection unit 108 refers to the image feature values, which have been input thereto, and in the case where the component 112 has not yet entered in the field of view of the camera 114, that is, in the case where the positional information of the component 112 is "0", the image selection unit 108 does not perform an operation and waits for the next image data item and image feature values. Once the component 112 has entered in the field of view of the camera 114, and the positional information of the component 112 has been changed to a value other than "0", the image selection unit 108 compares the reference image feature values stored in the memory 107 and the image feature values that are extracted from the image data item of the captured image. Then, the image selection unit 108 performs matching processing for determining whether given determination conditions are satisfied.

Then, among the image data items of the captured images, an image data item from which image feature values closer to the reference image feature values are extracted is selected. In the case where the image feature values that have been input are closer to the reference image feature values than the image feature values stored in the memory 107, the contents of the memory 107 are updated to the image data item and the image feature values that have been input. In addition, when the component 112 is moved outside the field of view of the camera 114, and the positional information of the component 112 is changed to "0" from a value other than "0", an image data item stored in the memory 107 at the time is read and output to the image output interface 109.

(S5 Output of Image)

The image data item, which has been input to the image output interface 109 and which is in the form of a parallel signal, is multiplied by, for example, seven and serialized by the image output interface 109, and then the image data item is output as an image signal through the 10 pairs of differential signal lines in accordance with an image signal standard such as Camera Link. The image signal, which has been output, is received and processed by an external frame grabber board or the like.

Through the above processes, when the component 112 passes through the target capturing position, an image data item having image feature values that are the closest to a sample image can be captured, and thus, the probability of failure to recognize the position and orientation of the component 112 can be reduced.

Exemplary Embodiment

In order to practice the above-described first embodiment, details of each component will be described using one exemplary embodiment.

Figure 3:
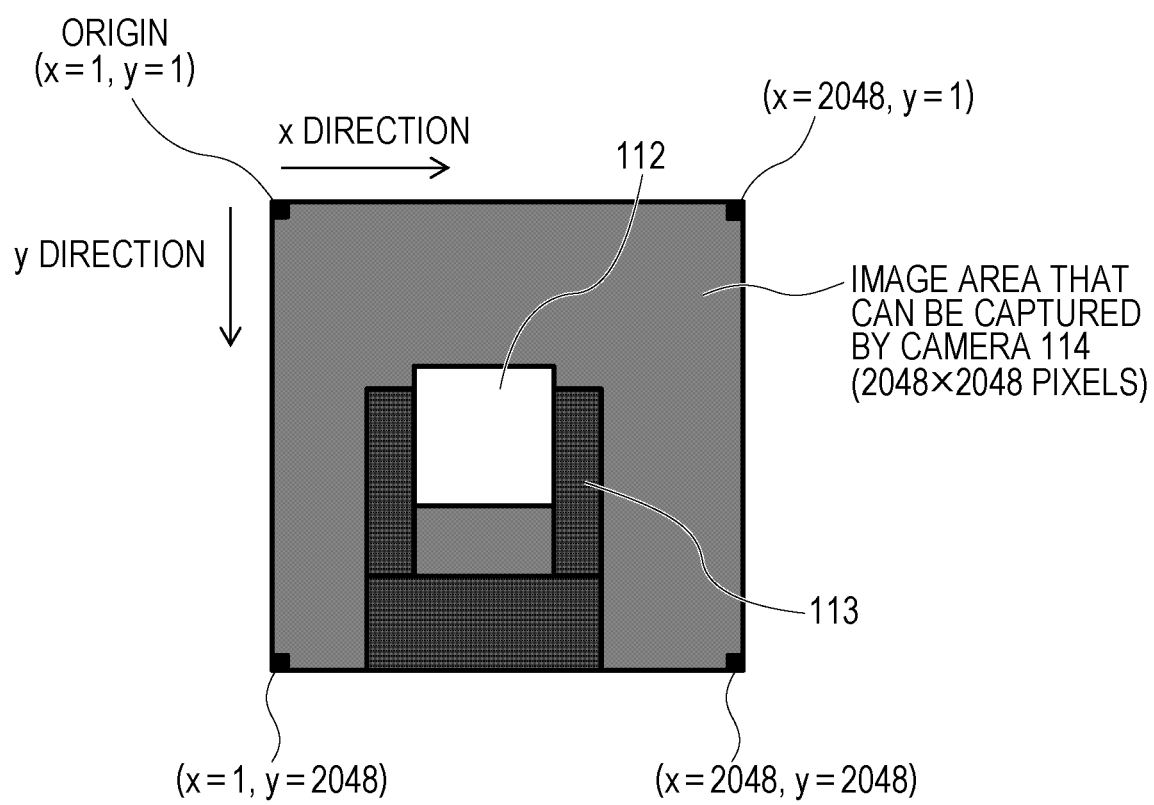
FIG. 3 is a diagram illustrating an example of an image data item according to the first embodiment and a second embodiment of the present invention.

First, a coordinate system that is a precondition for the present embodiment will be described. A coordinate system that relates to an image data item illustrated in FIG. 3 and that is used in the present embodiment will now be described. The coordinate system is formed on an image area that has 2048×2048 pixels and that can be captured by the camera 114, and in the image area, a direction toward the right side in the horizontal direction as viewed in FIG. 3 is defined as the x direction, and a direction toward the lower side in the vertical direction as viewed in FIG. 3 is defined as the y direction. The origin (x=1, y=1) of the coordinate system is the point located at the top left corner of the image area. For example, in the image area, the coordinates of the point located at the top right corner, the coordinates of the point located at the bottom left corner, and the coordinates of the point located at the bottom right corner are respectively (x=2048, y=1), (x=1, y=2048), and (x=2048, y=2048).

FIG. 3 illustrates an image data item obtained by capturing an image of the robot hand 113 that is holding the component 112.

The component 112 is an object that forms part of a product and has a size of, for example, 50 mm×50 mm or smaller. The component 112 is placed on a pallet and is not strictly positioned. The component 112 is to be picked up by the robot hand 113 and transported to a position where a workpiece (not illustrated) is disposed in order to assemble the product. When the component 112 is in a state of being held by the robot hand 113, the orientation of the component 112 has not yet been determined. After an image has been captured as "visual information" by the apparatus for capturing an image of a moving object according to the present invention, the position and orientation of the component 112 is measured through image processing, and the position and orientation of the component 112 is corrected by the robot hand 113. Then, the component 112 is mounted on the workpiece.

The robot hand 113, which has been installed on a workbench, includes, for example, three fingers and can stably hold the component 112 and transport the component 112 along a path along which the robot hand 113 has been previously instructed to move in a work area that is formed in the workbench and that has a size of 500 mm×500 mm. The robot hand 113 transports the component 112 at a velocity of 2,000 mm/sec. In the present embodiment, the robot hand 113 is instructed beforehand to move in the field of view of the camera 114 at a constant velocity of 2,000 mm/sec while holding the component 112. In this case, the robot hand 113 is instructed to move in such a manner that the component 112 crosses near the center of the field of view of the camera 114, and that a movement direction of the component 112 is close to the x direction in the image area, which is captured. In other words, the robot hand 113 is instructed to move in such a manner that the component 112 appears from the left end (x=1) of the image area, moves substantially linearly in the x direction, and disappears to the right end (x=2048) of the image area. Note that a surface of the robot hand 113 that is to be captured by the camera 114, which will be described below, is painted black, and the color of the background of the robot hand 113 that is to be captured by the camera 114 is also black. These are conducted as devices for suppressing generation of undesirable reflected light. In the present embodiment, the center (x=1024) of the image in the x direction is a target capturing position. Obviously, the target capturing position may be an arbitrary x coordinate or may be an arbitrary coordinate not in the x direction but in the y direction depending on the environments in which image capturing is performed and the like.

The image pickup element 101, the lens 102, and the computing section 115 that are included in the camera 114 will now be described.

The image pickup element 101 has a spatial resolution of about 4 megapixels (2048×2048 pixels), and each pixel have a bit depth of 8 bits. The image pickup element 101 outputs an image by 10 pairs of LVDS signals. In the case of outputting 4 megapixels, the frame rate is, for example, 160 fps. An image-capturing-optical system that is a combination of the image pickup element 101 and the lens 102 has a capturing field of view of 100 mm×100 mm and a pixel resolution of about 50 μm×50 μm. The image pickup element 101 writes a set value into a register, which is embedded in the image pickup element 101, through communication using a serial peripheral interface (SPI) or the like, and then reads an image of about 4 megapixels (2048×2048 pixels). The image pickup element 101 has the movie recording mode in which the image pickup element 101 continuously captures images at a fixed frame rate. In each captured frame, while the image pickup element 101 is transmitting a signal, a vertical synchronizing signal is high. In the present embodiment, first, a set value that causes the image pickup element 101 to operate in the movie recording mode is written into the register, which is embedded in the image pickup element 101, via the controller 103 in such a manner as to set the operation mode of the image pickup element 101 to the movie recording mode. An image that is captured by the image pickup element 101 is output to the image input interface 104, which will be described later.

The computing section 115 is an electronic circuit board equipped with the controller 103, the image input interface 104, the image-feature-amount-calculation unit 106, the memory 107, the image selection unit 108, and the image output interface 109. The controller 103, the image-feature-amount-calculation unit 106, and the image selection unit 108 are mounted as, for example, computing blocks in an FPGA device, which is to be mounted on the electronic circuit board. Each of the computing blocks is mounted by a combining circuit based on a hardware description using a hardware description language (HDL), which is commonly known, and a macro circuit included in the FPGA. Considering circuit area, manufacturing costs, and performance balance, the image input interface 104 and the image output interface 109 may be mounted in the FPGA, or the computing section 115 may be formed without using the FPGA.

The image input interface 104 uses a commonly known deserializer IC that converts LVDS signals, which are input to the image input interface 104 from the image pickup element 101, into parallel signals that are easy to use in an electronic circuit. The term "LVDS" refers to "low voltage differential signal". Alternatively, LVDS signals may be input to a commonly known field programmable gate array (FPGA), which is an integrated circuit whose function can be changed and which is capable of receiving LVDS signals, and inverted into parallel signals. As the deserializer IC, a device to which 10 differential pairs of LVDS signals can be input is used. Alternatively, a plurality of devices each having a capacity insufficient to receive 10 differential pairs of LVDS signals may be used in parallel as the deserializer IC. Here, signals that are output from the image input interface 104 are an 80-bit parallel signal (8 bits×10 TAP), a pixel clock signal, a horizontal synchronizing signal, and a vertical synchronizing signal, and these signals are output to the image-feature-amount-calculation unit 106.

The image-feature-amount-calculation unit 106 of the computing section 115 is a computing block that is mounted in the FPGA device mounted on the electronic circuit board. The image-feature-amount-calculation unit 106 detects the position of the component 112 in an image by using an image signal that is formed of the 80-bit parallel signal, the pixel clock signal, the horizontal synchronizing signal, and the vertical synchronizing signal, which have been input to the image-feature-amount-calculation unit 106 from the image input interface 104. In addition, the image-feature-amount-calculation unit 106 detects a total value of the luminance of the image as the image feature value correlated with illumination conditions. In the present embodiment, since the color of the robot hand 113 and the color of the background of the robot hand 113 when an image of the robot hand 113 is captured are black, image signals that are input to the image-feature-amount-calculation unit 106 indicate images such as those illustrated in FIG. 4. First, binarization processing is performed on a parallel image signal that has been input per 8 bits, which is one pixel, in such a manner as to acquire a binary image. The binarization processing is performed by setting the pixel value to HIGH (1) when a pixel value is greater than a predetermined threshold (e.g., 128) and LOW (0) when the pixel value is not greater than the threshold. The images illustrated in FIG. 5 are examples of such a binary image. However, in the present embodiment, the binarization processing is performed by pipeline processing at a pixel level as described later, and thus, it should be noted that a group of binary images such as those illustrated in FIG. 5 will not be stored or output. Next, the centroid of the binary image that denotes the positional information of the component 112 is calculated.

A method for calculating the centroid of a binary image having pixels whose values are 0 or 1 will now be described. The centroid of an image generally denotes the central coordinates of a mass distribution when luminance value is considered as mass, and in a binary image, the centroid of an image is the central coordinates of a plurality of pixels each having a luminance value of 1. In order to calculate the centroid of an image, the zeroth moment of the image and the first moment of the image are used. In general, such a moment of an image also denotes a gravitational moment when luminance value is considered as mass. The zeroth moment of a binary image denotes the total number of pixels each having a luminance value of 1, and the first moment of a binary image denotes the sum of positional coordinate values of pixels each having a luminance value of 1. In the present embodiment, the first moment of an image that is calculated with respect to the horizontal direction is referred to as the horizontal first moment of an image, and the first moment of an image that is calculated with respect to the vertical direction is referred to as the vertical first moment of an image. The horizontal coordinates of the centroid of an image can be calculated by multiplying the horizontal first moment of the image by the reciprocal of the zeroth moment of the image. The vertical coordinates of the centroid of an image can be calculated by multiplying the vertical first moment of the image by the reciprocal of the zeroth moment of the image.

Based on the above, the zeroth moment of the image, the horizontal first moment of the image, and the vertical first moment of the image are calculated with respect to the binary signal, which has been obtained. In the image-feature-amount-calculation unit 106, the following resisters are included in the computing block of the FPGA. That is to say, the image-feature-amount-calculation unit 106 includes a horizontal coordinate register, which is to be incremented in synchronization with a pixel clock and reset in synchronization with a horizontal synchronizing signal, and a vertical coordinate register, which is to be incremented in synchronization with a horizontal synchronizing signal and reset in synchronization with a vertical synchronizing signal. In addition, the image-feature-amount-calculation unit 106 includes a zeroth moment register, which holds the integral value of the zeroth moment of an image, a horizontal first moment resister, which holds the integral value of the horizontal first moment of an image, and a vertical first moment resister, which holds the integral value of the vertical first moment of an image. Each of the resisters holds zero as an initial value. First, when a one-bit binary image signal is input, a one-bit value is added to the value stored in the zeroth moment register. At the same time, a calculation (bit value×(value in horizontal coordinate register)) is performed, and the result is added to the value stored in the horizontal first moment resister. At the same time, a calculation (bit value×(value in vertical coordinate register)) is performed and the result is added to the value stored in the vertical first moment resister. The above calculations are repeated for the number of times corresponding to all the pixels (2048×2048 pixels) in synchronization with a pixel clock. As a result, in the entire image, the zeroth moment of the image, the horizontal first moment of the image, and the vertical first moment of the image are respectively stored in the zeroth moment register, the horizontal first moment resister, and the vertical first moment resister.

Next, the centroid of the image is calculated from the zeroth moment of the image, the horizontal first moment of the image, and the vertical first moment of the image, which have been calculated. The horizontal coordinates of the centroid of the image is calculated by a hardware computation using a formula (horizontal first moment resister value/zeroth moment register value). The vertical coordinates of the centroid of the image is calculated by a hardware computation using a formula (vertical first moment resister value/zeroth moment register value). The horizontal coordinates of the centroid of the image and the vertical coordinates of the centroid of the image, which have been calculated as described above, form the positional information of the component 112.

Figure 4:
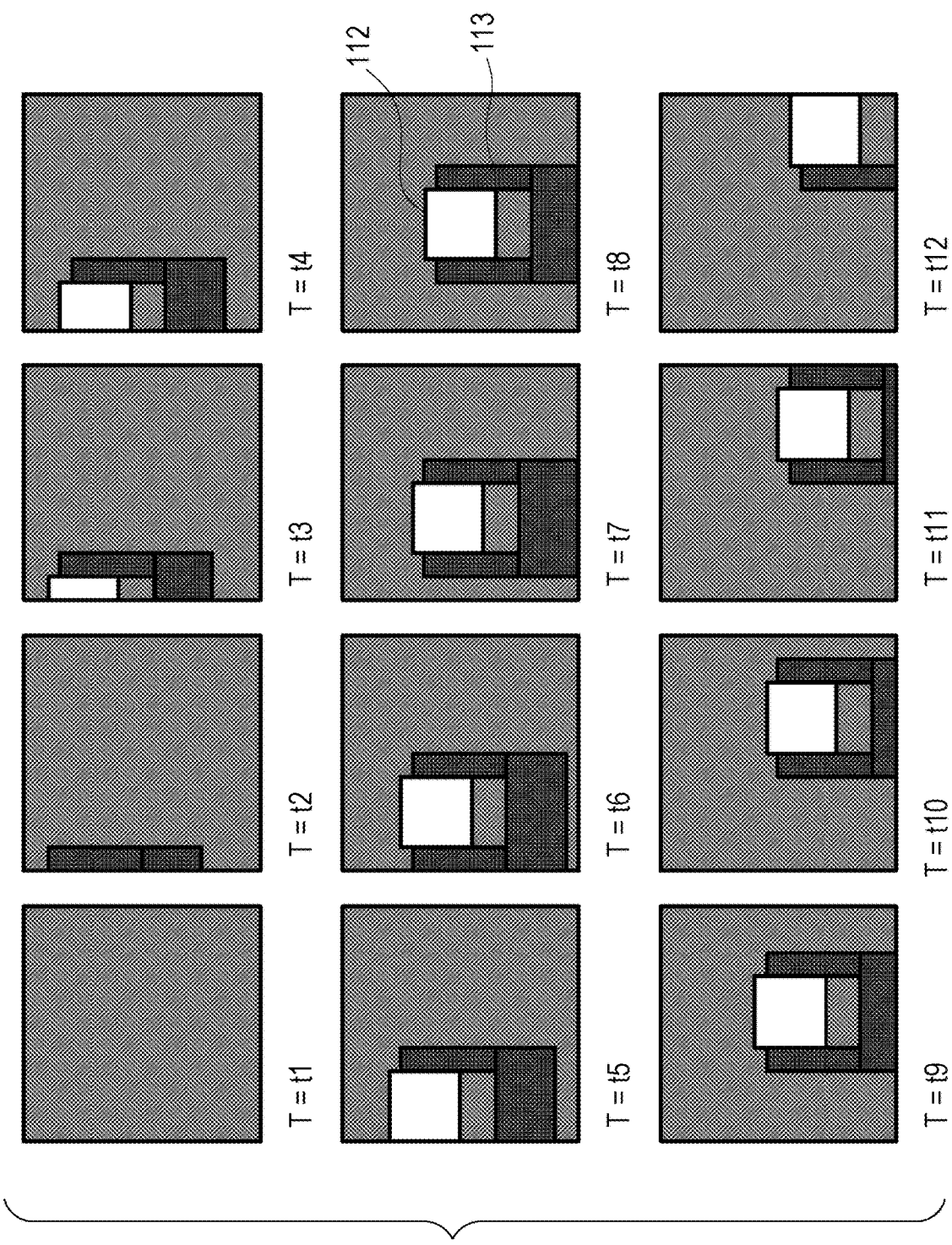
FIG. 4 is a diagram illustrating examples of captured images according to the first embodiment of the present invention.
Figure 5:
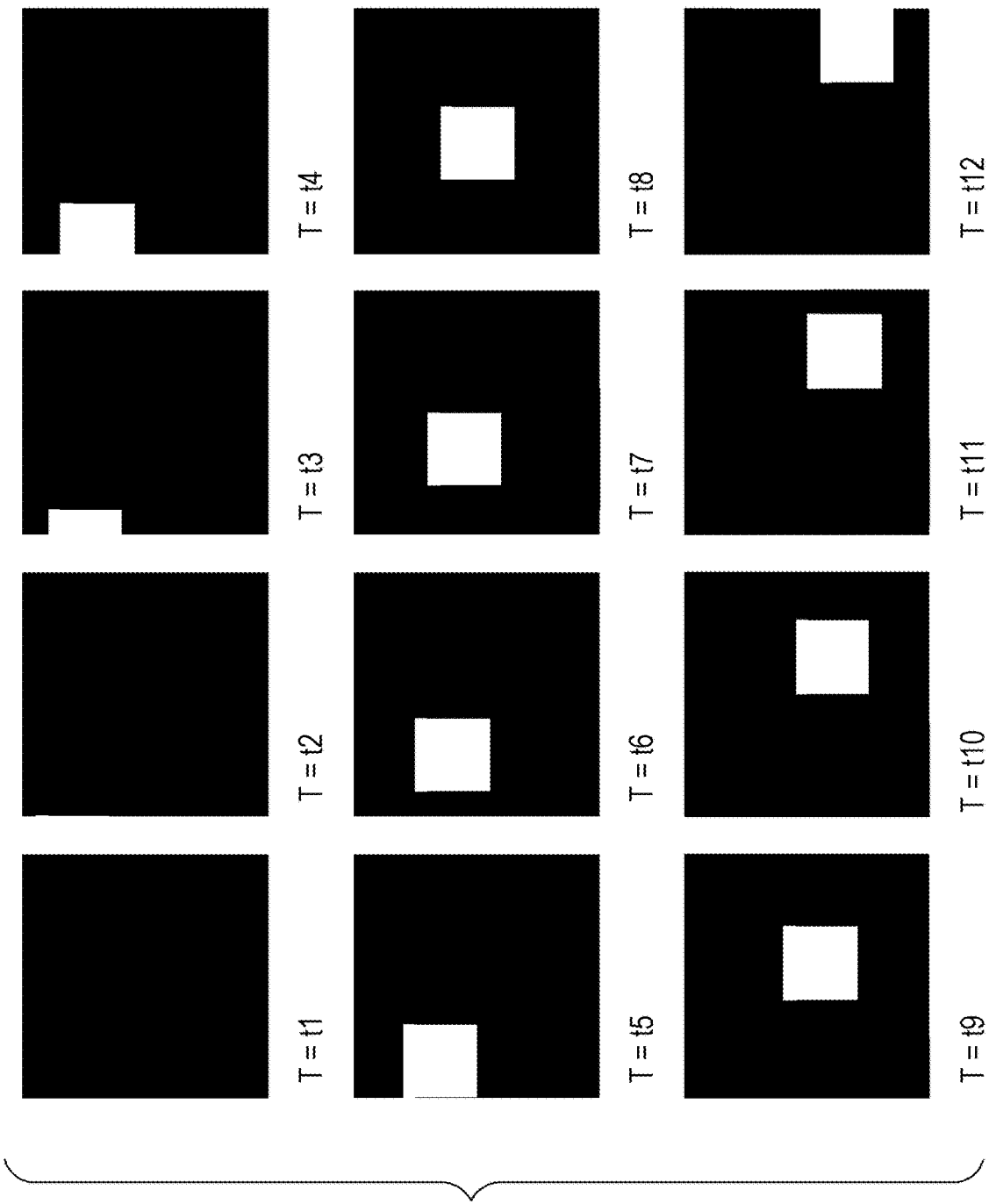
FIG. 5 is a diagram illustrating examples of binarized images according to the first embodiment of the present invention.

Regarding a series of image data items such as those illustrated in FIG. 4 that are to be input to the image-feature-amount-calculation unit 106 of the computing section 115, a total value of the luminance of each of the image data items is calculated. In the image-feature-amount-calculation unit 106, a luminance-total-value resister that holds the integral value of a total value of the luminance of an image in synchronization with a pixel clock is included in the computing block of the FPGA. The luminance-total-value resister holds zero as an initial value. First, when an 8-bit image signal is input, an 8-bit value is added to the value stored in the luminance-total-value resister. This calculation is repeated for the number of times corresponding to all the pixels (2048×2048 pixels) in synchronization with a pixel clock, and as a result, in the entire image, the total value of the luminance of the image is stored in the luminance-total-value resister.

The positional information of the component 112 and the total value of the luminance of the image, which have been calculated through the above computations, are output with the corresponding image data items from the image-feature-amount-calculation unit 106 and input to the image selection unit 108. Here, in the case where the component 112 is not present in the capturing field of view of the camera 114, "0" is output as positional information. Note that, among the above-described computations, the binarization processing performed on each pixel and accumulative calculations for the zeroth moment of the image, the horizontal first moment of the image, and the vertical first moment of the image are performed by pipeline processing. In other words, for example, instead of waiting until the binarization processing performed on all the pixels is completed, the accumulative calculation of a first pixel is performed while the binarization processing is performed on a second pixel, and the accumulative calculation of the second pixel is performed while the binarization processing is performed on a third pixel.

In the present embodiment, the method in which the centroid of an image is calculated after performing binarization processing on the image and calculating the zeroth moment of the image, the horizontal first moment of the image, and the vertical first moment of the image has been described as a method for detecting the position of the component 112 in an image. However, a commonly known method for detecting an object that is different from the above method and that is based on the fact that a background is black may be used. For example, a template image of the component 112, the template image having a resolution corresponding to an image captured by the camera 114, may be stored beforehand in the FPGA, a processing circuit that performs a commonly known template matching may be mounted in the FPGA, and the position of the component 112 may be detected. In the case where, despite the absence of the component 112 in the capturing field of view of the camera 114, the component 112 is detected due to noise mixed in an image, filtering processing in which the value of output coordinates is set to "0" while the value of the zeroth moment of the image is set to be a threshold may be performed.

In addition, in the description of the present embodiment, although a total value of the luminance of an image has been used as the image feature value correlated with illumination conditions, a different image feature value, such as those described above, may be used as long as it has been previously confirmed that the image feature value is correlated with illumination conditions.

The memory 107 is a random access memory (RAM) mounted on the electronic circuit board and is formed of a plurality of 256-Kbyte synchronous dynamic RAMs (SDRAMs). The plurality of SDRAMs includes, for example, 10 SDRAMs. The bit width of each of the SDRAMs is 8 bits. Each of the SDRAMs specifies a row address and a column address and is capable of performing reading and writing in synchronization with a synchronizing signal.

The image selection unit 108 is a computing block that is mounted in the FPGA device mounted on the electronic circuit board. The image selection unit 108 acquires the positional information of the component 112 that is formed of the horizontal coordinates of the centroid of an image and the vertical coordinates of the centroid of the image from the image-feature-amount-calculation unit 106. A total value of the luminance of the image and an image signal, which is formed of an 80-bit parallel signal, a pixel clock signal, a horizontal synchronizing signal, and a vertical synchronizing signal, are input to the image selection unit 108. In addition, the reference image feature values are input to the image selection unit 108 from the controller 103. The image selection unit 108 includes a memory interface that is used for accessing the memory 107. The memory interface is provided with 10 computing blocks that are connected in parallel in such a manner as to correspond to the 10 SDRAMs. When the vertical synchronizing signal becomes HIGH, the memory interface starts memory access and supplies a pixel clock signal as a synchronizing signal used in the memory access to the SDRAMs. In addition, the memory interface increments a row address in synchronization with the pixel clock signal and increments a column address in synchronization with a horizontal synchronizing signal in such a manner as to set an address used for accessing the SDRAMs. When the vertical synchronizing signal becomes LOW, the memory interface terminates the memory access. An image data item of one frame that has image feature values that most closely match the reference image feature values and the image feature values are stored in the memory 107. In an initial state, "0" is stored as an image data item and image feature values in the memory 107.

During the period when the positional information of the component 112, which has been input, is "0", that is, during the period when the component 112 has not yet reached the field of view of the camera 114, the image selection unit 108 does not perform an operation and waits for an image data item and image feature values that are to be input next. Then, when the positional information of the component 112 has changed from "0" to a value other than "0", the image selection unit 108 compares the reference image feature values stored in the memory 107 and the image feature values that have been input. After that, the image selection unit 108 determines whether the degree of matching between the input image feature values and the reference image feature values, which have been input from the controller 103, is higher than the degree of matching between the image feature values of an image stored in the memory 107 and the reference image feature values, which have been input from the controller 103. In the case where the degree of matching between the input image feature values and the reference image feature values input from the controller 103 is higher than the degree of matching between the image feature values of the image stored in the memory 107 and the reference image feature values input from the controller 103, the image selection unit 108 updates the contents of the memory 107 to the input image data item and the corresponding image feature values, or otherwise, the image selection unit 108 does not update the contents of the memory 107 and discards the input image data item and the corresponding image feature values.

Finally, when the positional information of the component 112 is changed to "0" from a value other than "0", the image selection unit 108 reads the image data item stored in the memory 107 at the time and outputs the image data item to the image output interface 109.

A method for determining whether the degree of matching between the image feature values, which have been input, and the reference image feature values is higher than the degree of matching between the image feature values stored in the memory 107 and the reference image feature values will now be described. First, it is determined that the entirety of the component 112 is located in the field of view of the camera 114. Referring to the positional information of the component 112 included in the input image feature values, in the case where the horizontal coordinates of the centroid of the image is 513 or greater and 1,536 or smaller, and where the vertical coordinates of the centroid of the image is 513 or greater and 1,536 or smaller, the rank of the image feature values is determined as A, or otherwise determined as B.

Next, the total value of the luminance of the image is evaluated. The absolute value of the difference between the total value of the luminance of the image, which is included in the input image feature values, and the reference image feature values is calculated.

Finally, it is determined which one of the degree of matching between the image feature values stored in the memory 107 and the reference image feature values and the degree of matching between the input image feature values and the reference image feature values is higher, and the input image feature values are rated as "Excellent" or "Poor". The rank of the image feature values stored in the memory 107 is determined as one of A, B, or "0" by a method similar to the method for determining the rank of the input image feature values. In addition, the absolute value of the difference between the total value of the luminance of the image and the reference image feature values is calculated. In the case where the image feature values stored in the memory 107 are "0", the input image feature values are rated as "Excellent". In the case where the rank of the image feature values stored in the memory 107 is B, if the rank of the input image feature values is A, the input image feature values are rated as "Excellent". In the case where the rank of the input the image feature values is B, if the absolute value of the difference between the input image feature values and the reference image feature values is not greater than the image feature values stored in the memory 107, the input image feature values are rated as "Excellent", and if the absolute value is greater than the image feature values stored in the memory 107, the input image feature values are rated as "Poor". In the case where the rank of the image feature values stored in the memory 107 is A, if the rank of the input image feature values is B, the input image feature values are rated as "Poor". In the case where the rank of the input image feature values is A, if the absolute value of the difference between the input image feature values and the reference image feature values is not greater than the image feature values stored in the memory 107, the input image feature values are rated as "Excellent", and if the absolute value is greater than the image feature values stored in the memory 107, the input image feature values are rated as "Poor". In the case where the input image feature values are rated as "Excellent" through the above determination processes, the degree of matching between the input image feature values and the reference image feature values is considered as high, and the contents of the memory 107 are updated to the image signal and the image feature values, which have been input. If the input image feature values are rated as "Poor", the contents of the memory 107 will not be updated, and the input image data item and the corresponding image feature values are discarded.

In the present embodiment, the process for rating the image feature values stored in the memory 107 and the calculation for the absolute value of the difference between the total value of the luminance of the image and the reference image feature values are performed in accordance with the timing of performing the calculation for the input image feature values. However, the results of the rating process that is performed when the image feature values are stored in the memory 107 and the results of the calculation for the absolute value of the difference between the total value of the luminance of the image and the reference image feature values may be stored and reused.

The image output interface 109 uses a serializer IC that converts the 80-bit parallel signal, the pixel clock signal, the horizontal synchronizing signal, and the vertical synchronizing signal, which have been input from the image selection unit 108, into LVDS image signals conforming to Camera Link or the like. Alternatively, using an FPGA device that is capable of outputting LVDS signals may be used in such a manner as to convert parallel signals into serial signals in the FPGA. The LVDS signals output from the image output interface 109 are received by an external camera link grabber board or the like, and image processing is performed on the LVDS signals by a processor or the like.

The controller 103 is a computing block that is to be mounted in the FPGA device mounted on the electronic circuit board. The controller 103 issues a continuous-image-capturing-setting command to the image pickup element 101 via an SPI interface in such a manner as to cause the image pickup element 101 to have the movie recording mode. In addition, the controller 103 stores the reference image feature values that are input from the outside beforehand into an internal resister and outputs the reference image feature values to the image selection unit 108. Note that the reference image feature values are the positional information of the component 112, which is formed of the horizontal coordinates of the centroid of an image and the vertical coordinates of an image, and the total value of the luminance of an image that are calculated from an image data item, which has been used when the image processing algorithm has been previously determined, by a method that is the same as the above-described calculation method.

According to the present embodiment, an image that is similar to an image data item, which has been used when the image processing algorithm has been previously determined, can be captured. Thus, among a plurality of captured images of the component 112 that moves in the vicinity of the target capturing position, only one image that is the best image in which image processing is most likely to be properly completed can be output. Therefore, even if a frame in which ambient light of, for example, a fluorescent lamp and the like is reflected is produced, or even if a frame in which a shadow is reflected is produced due to the amount of displacement with respect to the target capturing position and a change in illumination conditions as a result of swing and tilt, the position and orientation of the component 112 can be correctly recognized.

Second Embodiment

In the above-described first embodiment, the colors of the robot hand 113 and the background of the robot hand 113 in an image captured by the camera 114 are black in such a manner as to provide advantages in capturing an image of the component 112 and subsequent image processing. However, in an actual manufacturing site, such as a manufacturing factory, there is a probability that other component to be assembled may be present in the background of an image to be captured. Thus, when an image is captured the color of the background of the image is not always set to black. Even in the case where the entire color of the background is set to black, there is a possibility that the background will be brightened by reflection of ambient light and the like, and thus, there is a problem in that there is a possibility that the color of the background of an image to be captured may not be set to black.

Accordingly, as a second embodiment, an apparatus for capturing an image of a moving object that captures an image of a component that is moving under illumination conditions similar to those under which an image that has been previously assumed is captured even if the background of the image to be captured has brightness and that performs a background removal processing will be described.

Figure 6:
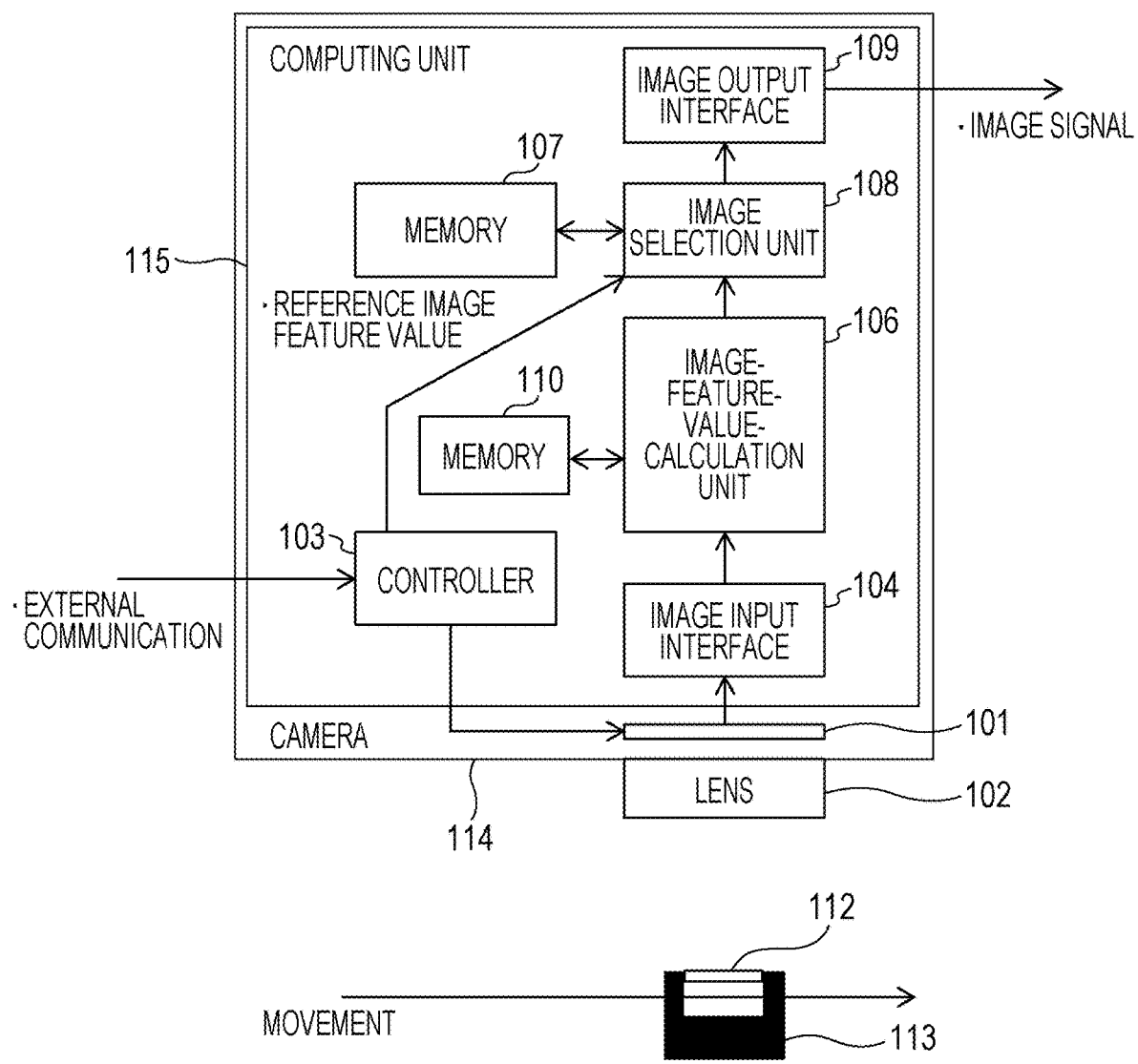
FIG. 6 is a block diagram illustrating an apparatus for capturing an image of a moving object according to the second embodiment of the present invention.

FIG. 6 illustrates the configuration of the apparatus for capturing an image of a moving object according to the second embodiment of the present invention. The apparatus for capturing an image of a moving object according to the second embodiment of the present invention includes a camera 114, which includes an image pickup element 101, a lens 102, and a computing section 115, a component 112, and a robot hand 113 that is used for holding a component 112. The computing section 115 includes a controller 103, an image input interface 104, an image-feature-value-calculation unit 106, a memory 107, a memory 110, an image selection unit 108, and an image output interface 109. Since the flow of processes when the apparatus for capturing an image of a moving object captures an image of the component 112, which is moving while being held by the robot hand 113, is similar to that in the first embodiment, the description of the flow of processes will be omitted, and the robot hand 113 and the image-feature-amount-calculation unit 106 will be described.

First, the robot hand 113 will be described. The robot hand 113 includes, for example, three fingers and can stably hold the component 112 and transport the component 112 along a path along which the robot hand 113 has been previously instructed to move in a work area that has a size of 500 mm×500 mm. The robot hand 113 is capable of transporting the component 112 at a velocity of up to 2,000 mm/sec. Also in the present embodiment, the robot hand 113 moves in the field of view of the camera 114, which will be described later, at a constant velocity of 2,000 mm/sec while holding the component 112. In this case, the component 112 crosses near the center of the field of view of the camera 114, and a movement direction of the component 112 is close to the x direction in an image that is captured. In other words, the robot hand 113 is instructed to move in such a manner that the component 112 appears from the left end (x=1) of an image area, moves substantially linearly in the x direction, and disappears to the right end (x=2048) of the image area. Note that optical characteristics, such as color and brightness, of the background of the robot hand 113 that is to be captured by the camera 114 do not change over time. In the present embodiment, the center (x=1024) of the image in the x direction is a target capturing position. Obviously, the target capturing position may be an arbitrary x coordinate or may be an arbitrary coordinate not in the x direction but in the y direction depending on lighting environments and the like.

Next, the memory 110 will be described. The memory 110 is a RAM mounted on an electronic circuit board and is formed of a plurality of 256-Kbyte SDRAMs. The plurality of SDRAMs includes, for example, 10 SDRAMs. The bit width of each of the SDRAMs is 8 bits. Each of the SDRAMs specifies a row address and a column address and is capable of performing reading and writing in synchronization with a synchronizing signal.

Next, the image-feature-amount-calculation unit 106 will be described. The image-feature-amount-calculation unit 106 is a computing block that is mounted in an FPGA device mounted on the electronic circuit board. The image-feature-amount-calculation unit 106 detects the position of the component 112 in an image by using an image signal that is formed of an 80-bit parallel signal, a pixel clock signal, a horizontal synchronizing signal, and a vertical synchronizing signal, which have been input to the image-feature-amount-calculation unit 106 from the image input interface 104. In addition, the image-feature-amount-calculation unit 106 detects a total value of the luminance of an image as the image feature value correlated with illumination conditions. The image-feature-value-calculation unit 106 includes a memory interface that is used for accessing the memory 107.

The memory interface is provided with 10 computing blocks that are connected in parallel in such a manner as to correspond to the 10 SDRAMs. When the vertical synchronizing signal becomes HIGH, the memory interface starts memory access and supplies a pixel clock signal as a synchronizing signal used in the memory access to the SDRAMs. In addition, the memory interface increments a row address in synchronization with the pixel clock signal and increments a column address in synchronization with a horizontal synchronizing signal in such a manner as to set an address used for accessing the SDRAMs. When the vertical synchronizing signal becomes LOW, the memory interface terminates the memory access. An image signal of a frame immediately before the last frame is stored in the memory 110.

Figure 7:
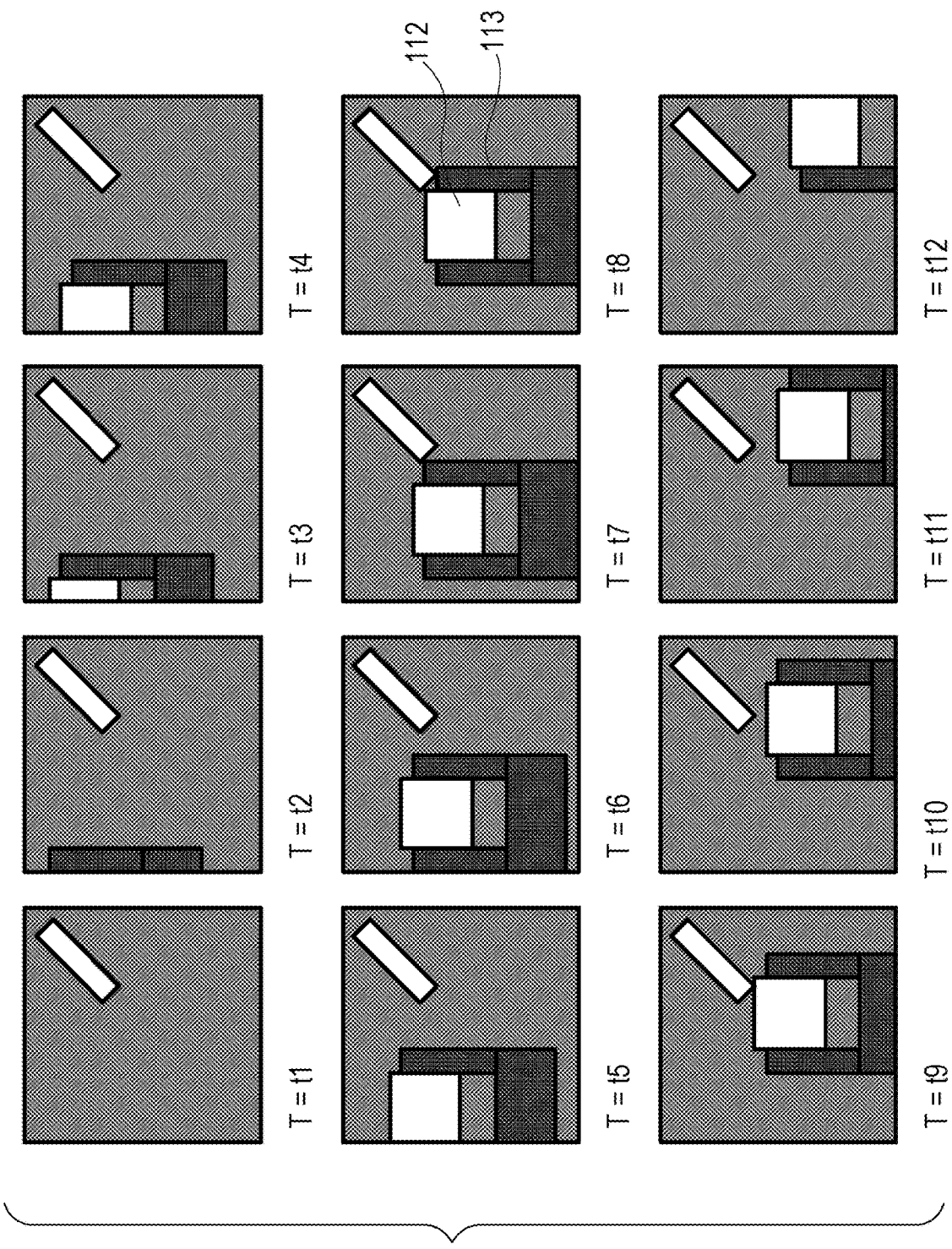
FIG. 7 is a diagram illustrating examples of captured images according to the second embodiment of the present invention.

In the present embodiment, image signals that are input to the image-feature-amount-calculation unit 106 indicate images such as those illustrated in FIG. 7. First, a total value of the luminance of an image with relevant to a parallel image signal that has been input is calculated. In the image-feature-amount-calculation unit 106, a luminance-total-value resister that holds the integral value of a total value of the luminance of an image in synchronization with a pixel clock is included in the computing block of the FPGA. The luminance-total-value resister holds zero as an initial value. First, when an 8-bit image signal is input, an 8-bit value is added to the value stored in the luminance-total-value resister. This calculation is repeated for the number of times corresponding to all the pixels (2048×2048 pixels) in synchronization with a pixel clock, and as a result, in the entire image, the total value of the luminance of the image is stored in the luminance-total-value resister.

A process for calculating the positional information of the component 112 that is to be performed along with the above processing will now be described.

Figure 8:
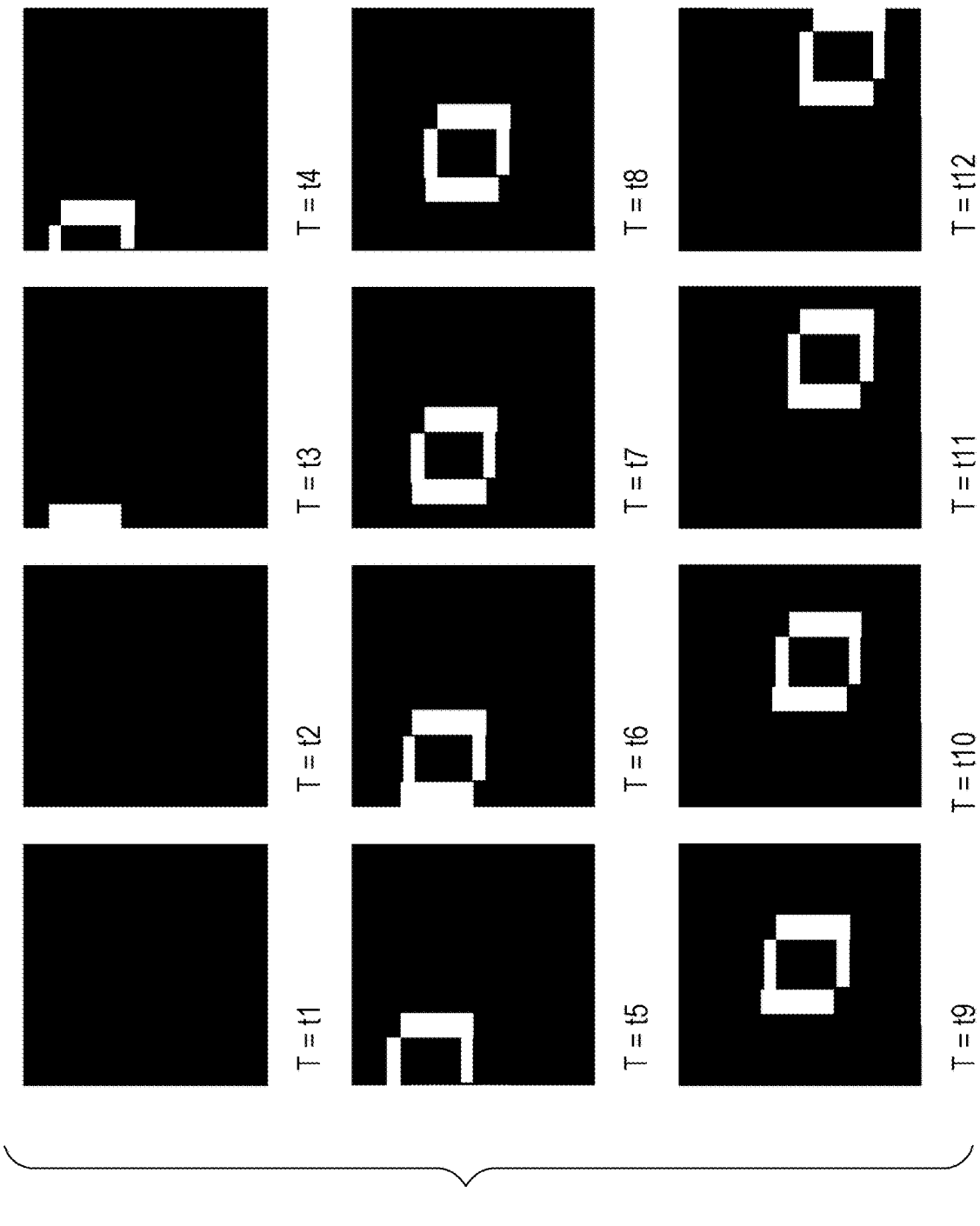
FIG. 8 is a diagram illustrating examples of inter-frame differences of images that have been converted into binary representations according to the second embodiment of the present invention.

First, the difference value between the last image and an image that is one frame before the last image and that is read from the memory 110 via the memory interface in synchronization with a parallel image signal, a pixel clock signal, a horizontal synchronizing signal, and a vertical synchronizing signal, that are input, is calculated on a pixel-by-pixel basis. Next, binarization processing is performed on the difference value of each pixel. The binarization processing is performed by setting the pixel value to HIGH (1) when the pixel value is greater than a predetermined threshold (e.g., 128) and to LOW (0) when the pixel value is not greater than the threshold. Examples of images that have been binarized are illustrated in FIG. 8. However, in the present embodiment, the binarization processing is performed by pipeline processing at a pixel level as described later, and thus, it should be noted that a group of binary images such as those illustrated in FIG. 8 will not be stored or output.

Next, the zeroth moment of the image, the horizontal first moment of the image, and the vertical first moment of the image are calculated with respect to the binary signal, which has been obtained. In the image-feature-amount-calculation unit 106, the following resisters are included in the computing block of the FPGA. That is to say, the image-feature-amount-calculation unit 106 includes a horizontal coordinate register, which is to be incremented in synchronization with a pixel clock and reset in synchronization with a horizontal synchronizing signal, and a vertical coordinate register, which is to be incremented in synchronization with a horizontal synchronizing signal and reset in synchronization with a vertical synchronizing signal. In addition, the image-feature-amount-calculation unit 106 includes a zeroth moment register, which holds the integral value of the zeroth moment of an image, a horizontal first moment resister, which holds the integral value of the horizontal first moment of an image, and a vertical first moment resister, which holds the integral value of the vertical first moment of an image. Each of the resisters holds zero as an initial value. First, when a one-bit binary image signal is input, a one-bit value is added to the value stored in the zeroth moment register. At the same time, a calculation (bit value×(value in horizontal coordinate register)) is performed, and the result is added to the value stored in the horizontal first moment resister. At the same time, a calculation (bit value×(value in vertical coordinate register)) is performed and the result is added to the value stored in the vertical first moment resister. The above calculations are repeated for the number of times corresponding to all the pixels (2048×2048 pixels) in synchronization with a pixel clock. As a result, in the entire image, the zeroth moment of the image, the horizontal first moment of the image, and the vertical first moment of the image are respectively stored in the zeroth moment register, the horizontal first moment resister, and the vertical first moment resister.

Next, the centroid of the image is calculated from the zeroth moment of the image, the horizontal first moment of the image, and the vertical first moment of the image, which have been calculated. The x coordinate of the centroid of the image is calculated by a hardware computation using a formula (horizontal first moment resister value/zeroth moment register value). The y coordinate of the centroid of the image is calculated by a hardware computation using a formula (vertical first moment resister value/zeroth moment register value). The positional information of the component 112 and the total value of the luminance of the image, which are calculated by the above computations, are output from the image-feature-amount-calculation unit 106 and input to the image selection unit 108. Here, in the case where the component 112 is not present in the capturing field of view of the camera 114, "0" is output as positional information. Note that, among the above-described computations, the binarization processing performed on each pixel and accumulative calculations for the zeroth moment of the image, the horizontal first moment of the image, and the vertical first moment of the image are performed by pipeline processing. In other words, for example, instead of waiting until the binarization processing performed on all the pixels is completed, the accumulative calculation of a first pixel is performed while the binarization processing is performed on a second pixel, and the accumulative calculation of the second pixel is performed while the binarization processing is performed on a third pixel. Finally, the contents of the memory 110 is overwritten with the parallel image signal, which has been input, via the memory interface by the pixel clock signal, the horizontal synchronizing signal, and the vertical synchronizing signal, and an image of one frame is stored into the 10 SDRAMs. The image that is stored will be used as an image that is one frame before the next frame.

Although, in the present embodiment, the method for removing the background of an image of the component 112 that is captured by an inter-frame difference method has been described, a commonly known background removal processing that is different from the method may be used. For example, a background image in which the component 112 and the robot hand 113 do not appear may be stored in the memory 110 beforehand by using the memory 110 as a non-volatile memory, and the background may be removed by calculating the difference between the background image and an image to be captured, or other algorithms for removing the background may be used. In the case where, despite the absence of the component 112 in the capturing field of view of the camera 114, the component 112 is detected due to noise mixed in an image, filtering processing in which the value of output coordinates is set to "0" while the value of the zeroth moment of the image is set to be a threshold may be performed. In addition, in the description of the present embodiment, although a total value of the luminance of an image has been used as the image feature value correlated with illumination conditions, a different image feature value, such as those described above, may be used as long as it has been previously confirmed that the image feature value is correlated with illumination conditions.

According to the present embodiment, image capturing can be efficiently performed even if the background of an image of the robot hand 113 that is to be captured by the camera 114 is not black and has brightness. In other words, among a plurality of captured images of the component 112 that moves in the vicinity of the target capturing position, one image that is the best image in which image processing is most likely to be properly completed can be output. Thus, in a situation where it is difficult to set the color of the background of an image to black, the position and orientation of the component 112 can be correctly recognized.

By performing a method for producing an item that is to be performed by a robot apparatus that includes a camera, which performs the image capturing method according to the present invention, and a robot hand, an image of an object held by the robot hand can be effectively captured while the object is moving, and thus, an production activity can be effectively performed.

The present invention can be used in an assembling robot system.

According to the present invention, an image to be output is selected while the position of a component and also an image feature value that is correlated with illumination conditions under which images have been captured function as references. Thus, in the case where a component that is moving has been inclined due to vibration and the like generated during transportation of the component, an image that has an image feature value equivalent to a sample image can be selected and output. Therefore, an image can be captured under illumination conditions similar to those under which an image that has been assumed is captured, and thus, the present invention has an advantageous effect in that the position and orientation of a component that is moving can be correctly recognized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A method comprising:
   acquiring a plurality of pieces of image data by capturing images of an object;
   computing image feature values of the respective pieces of image data;
   calculating a degree of matching, for each of the plurality of pieces of image data, by comparing the image feature values with reference image feature values that have been acquired in advance;
   comparing degrees of matching of at least two pieces of image data among the plurality of pieces of image data of which degrees of matching are calculated;
   selecting a piece of image data having a higher degree of matching from among the plurality of pieces of image data of which the degrees of matching have been compared;
   performing a first process on a first piece of image data selected by comparing the degrees of matching of the plurality of pieces of image data; and
   performing a second process on a second piece of image data not selected by comparing the degrees of matching of the plurality of pieces of image data,
   wherein the second process is different form the first process.

2. The method according to claim 1, wherein the image data is image data of one frame.

3. The method according to claim 1, wherein the piece of image data selected by comparing the degrees of matching of the plurality of pieces of image data is stored in a memory.

4. The method according to claim 3, wherein a piece of image data having a lower degree of matching, of the at least two piece of image data of which the degrees of matching have been compared, is discarded.

5. The method according to claim 3, wherein an image feature value of the image data having the higher degree of matching is stored in the memory together with the image data having the higher degree of matching.

6. The method according to claim 1, wherein the image feature value is at least one of a total value of luminance of an image, a total value of luminance in image areas obtained by dividing an image into a plurality of blocks, a coordinate value of a feature point, a density gradient value in a particular image area, and an intensity value of a contour line.

7. The method according to claim 1, further comprising performing background removal processing on an image that is captured by an image-capturing-optical system.

8. The method according to claim 1, further comprising recognizing the object by performing image processing on the image data selected by comparing the degrees of matching of the plurality of pieces of image data.

9. The method according to claim 1, further comprising acquiring positional information about the object in the acquired plurality of pieces of image data on the object,
   wherein, in a case where the positional information is within a predetermined range, computing the image feature values of the respective pieces of the image data, calculating the degree of matching between the image feature values and the reference image feature values, and comparing the degrees of matching are performed.

10. The method according to claim 1, wherein the image feature values correlate a brightness of at least a portion of the object in a field of view of an image-capturing-optical system for capturing images of the object.

11. The method according to claim 1, wherein the first process is saving the first piece of image data, and the second process is discarding the second piece of image data.

12. A non-transitory computer-readable storage medium storing a program configured to cause a computer to execute the method according to claim 1.

13. An apparatus comprising:
   an image-capturing-optical system configured to acquire image data by capturing an image of an object; and
   one or more processors configured to perform image processing on the image data,
   wherein the image-capturing-optical system is configure to acquire a plurality of pieces of image data by capturing images of the object and transmit the plurality of pieces of image data to the one or more processors,
wherein the one or more processors are configured to compute image feature values of the respective pieces of image data, calculate degrees of matching between the image feature values and reference image feature values that have been acquired in advance, compare degrees of matching of at least two pieces of image data among the plurality of pieces of image data, and select a piece of image data having a higher degree of matching of the at least two pieces of image data,
wherein the one or more processors are configured to perform a first process on a first piece of image data selected by comparing the degrees of matching of the plurality of pieces of image data; and to perform a second process on a second piece of image data not selected by comparing the degrees of matching of the plurality of pieces of image data, and
wherein the second process is different form the first process.

14. The apparatus according to claim 13, wherein the object moves in a field of view of the image-capturing-optical system.

15. The apparatus according to claim 13, wherein the one or more processors further compute positional information about the object in the image data, and in a case where the positional information is within a predetermined range, compute the image feature values of the respective pieces of image data, calculate the degrees of matching between the image feature values and the reference image feature value, and compare the degrees of matching.

16. The apparatus according to claim 13, further comprising a memory,
wherein the memory stores the piece of image data selected by comparing the degrees of matching of the plurality of pieces of image data.

17. The apparatus according to claim 16, wherein an image feature value of the piece of image data having the higher degree of matching is stored in the memory together with the piece of image data having the higher degree of matching.

18. The apparatus according to claim 16, wherein, in a case where the degree of matching of the piece of image data selected by the one or more processors is higher than a degree of matching of the piece of image data stored in the memory, the apparatus discards a piece of image data having a lower degree of matching.

19. The apparatus according to claim 13, wherein the image data is image data of one frame.

20. The apparatus according to claim 13, wherein an image feature value is at least one of a total value of luminance of an image, a total value of luminance in image areas obtained by dividing an image into a plurality of blocks, a coordinate value of a feature point, a density gradient value in a particular image area, and an intensity value of a contour line.

21. The apparatus according to claim 13, wherein the one or more processors further perform background removal processing on an image that is captured by the image-capturing-optical system.

22. The apparatus according to claim 13, wherein the one or more processors recognize the object by performing the image processing on the piece of image data selected by comparing the degrees of matching of the plurality of pieces of image data.

23. The apparatus according to claim 13, wherein the image feature values correlate a brightness of at least a portion of the object in a field of view of the image-capturing-optical system.

24. The apparatus according to claim 13, wherein the first process is saving the first piece of image data, and the second process is discarding the second piece of image data.

25. An apparatus comprising:
an image-capturing-optical system configured to acquire image data by capturing an image of an object;
one or more processors configured to perform image processing on the image data; and
a robot hand configured to grab and move the object,
wherein the image-capturing-optical system is configured to acquire a plurality of pieces of image data by capturing images of the object and transmit the plurality of pieces of image data to the one or more processors,
wherein the one or more processors are configured to compute image feature values of the respective pieces of image data, calculate degrees of matching between the image feature values and reference image feature values that have been acquired in advance, compare degrees of matching of at least two pieces of image data among the plurality of pieces of image data, and select a piece of image data having a higher degree of matching of the at least two pieces of image data,
wherein the one or more processors recognize a position and orientation of the object by performing image processing on the piece of image data selected by comparing the degrees of matching of the plurality of pieces of image data, and
wherein the robot hand performs processing on the object based on the position and orientation.

26. A method for manufacturing a workpiece using an apparatus including an image-capturing-optical system configured to acquire image data by capturing an image of an object, one or more processors configured to perform image processing on the image data, and a robot hand configured to grab and move the object, the method comprising:
acquiring a plurality of pieces of image data by capturing images of the object and transmitting the plurality of pieces of image data to the one or more processors, by the image capturing apparatus;
computing image feature values of the respective pieces of image data and calculating degrees of matching between the image feature values and reference image feature values that have been acquired in advance, by the one or more processors;
comparing degrees of matching of at least two pieces of image data among the plurality of pieces of image data and selecting a piece of image data having a higher degree of matching, by the one or more processors;
recognizing a position and orientation of the object by performing the image processing on the selected piece of image data, by the one or more processors; and
causing the robot hand to perform processing on the object based on the position and orientation.

27. The method for manufacturing the workpiece according to claim 26, wherein the object is a component, and
wherein, in the causing the robot hand to perform the processing on the object, processing of assembling the component to the workpiece is performed.

28. The method for manufacturing the workpiece according to claim 26, wherein the image feature values correlate a brightness of at least a portion of the object in a field of view of the image-capturing-optical system.

* * * * *